United States Patent
Sharma et al.

(10) Patent No.: US 11,108,977 B1
(45) Date of Patent: Aug. 31, 2021

(54) DUAL WAVELENGTH EYE IMAGING

(71) Applicant: Facebook Technologies, LLC, Menlo Park, CA (US)

(72) Inventors: Robin Sharma, Redmond, WA (US); Andrew John Ouderkirk, Redmond, WA (US); Qi Zhang, Kirkland, WA (US); Christopher Yuan-Ting Liao, Seattle, WA (US); Karol Constantine Hatzilias, Kenmore, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/796,736

(22) Filed: Feb. 20, 2020

(51) Int. Cl.
*G02B 27/01* (2006.01)
*G02B 27/00* (2006.01)
*H04N 5/33* (2006.01)

(52) U.S. Cl.
CPC ......... *H04N 5/332* (2013.01); *G02B 27/0093* (2013.01); *G02B 27/0172* (2013.01); *G02B 2027/0138* (2013.01); *G02B 2027/0174* (2013.01); *G02B 2027/0178* (2013.01)

(58) Field of Classification Search
CPC .................................................... H04N 5/332
See application file for complete search history.

(56) References Cited

U.S. PATENT DOCUMENTS

| | | | |
|---|---|---|---|
| 5,815,741 A | 9/1998 | Okuyama et al. | |
| 7,677,730 B2 * | 3/2010 | Shimizu | A61B 3/14 351/206 |
| 9,170,436 B2 * | 10/2015 | Gibson | G02B 6/0076 |
| 10,268,268 B1 | 4/2019 | Trail | |
| 10,274,730 B2 | 4/2019 | Jepsen et al. | |
| 10,429,657 B1 * | 10/2019 | Sharma | G06T 7/0012 |
| 10,466,496 B2 * | 11/2019 | Parsons | G02B 5/1876 |
| 10,725,274 B1 * | 7/2020 | Sharma | G02B 17/0812 |
| 2008/0212027 A1 * | 9/2008 | Shimizu | A61B 3/14 351/206 |
| 2014/0347608 A1 * | 11/2014 | Kato | G02F 1/13 349/96 |
| 2015/0312560 A1 * | 10/2015 | Deering | A61F 2/1602 345/1.3 |
| 2016/0011353 A1 * | 1/2016 | Escuti | G02B 5/3083 359/15 |

(Continued)

FOREIGN PATENT DOCUMENTS

| | | |
|---|---|---|
| EP | 3079560 A1 | 10/2016 |
| WO | 2016162822 A1 | 10/2016 |

OTHER PUBLICATIONS

International Searching Authority, Patent Cooperation Treaty, European Application No. PCT/US2021/014970, dated Apr. 15, 2021, 3 pages.

(Continued)

*Primary Examiner* — Irfan Habib
(74) *Attorney, Agent, or Firm* — Freestone IP Law PLLC; Aaron J. Visbeek

(57) ABSTRACT

An eye is illuminated with a first non-visible light wavelength and a second non-visible light wavelength. A first ocular image is captured from first reflected light having the first non-visible light wavelength and a second ocular image is captured from second reflected light having the second non-visible light wavelength.

20 Claims, 11 Drawing Sheets

(56) References Cited

U.S. PATENT DOCUMENTS

| | | | |
|---|---|---|---|
| 2016/0180591 A1* | 6/2016 | Shiu | G06F 3/013 345/633 |
| 2016/0377868 A1* | 12/2016 | Ouderkirk | G02B 17/004 359/485.01 |
| 2016/0377871 A1* | 12/2016 | Kress | G02B 27/0172 359/567 |
| 2017/0235143 A1* | 8/2017 | Chi | G02B 26/101 359/204.2 |
| 2018/0070819 A1 | 3/2018 | Kanamori et al. | |
| 2018/0356639 A1* | 12/2018 | Schaefer | G02F 1/29 |
| 2019/0019023 A1 | 1/2019 | Konttori et al. | |
| 2019/0041642 A1* | 2/2019 | Haddick | G02B 27/0172 |
| 2019/0046031 A1 | 2/2019 | Kramer et al. | |
| 2019/0101757 A1* | 4/2019 | Martinez | G06F 3/013 |
| 2019/0101767 A1 | 4/2019 | Geng et al. | |
| 2019/0121132 A1* | 4/2019 | Shamir | G06F 3/048 |
| 2019/0227375 A1* | 7/2019 | Oh | G02F 1/133526 |
| 2019/0271845 A1* | 9/2019 | Cormier | G02B 27/0172 |
| 2019/0282089 A1 | 9/2019 | Wang | |
| 2019/0293838 A1* | 9/2019 | Haba | G02B 1/02 |
| 2019/0361250 A1 | 11/2019 | Lanman et al. | |
| 2020/0064627 A1* | 2/2020 | Ouderkirk | G06F 3/013 |
| 2020/0074651 A1 | 3/2020 | Zhang | |
| 2020/0096767 A1* | 3/2020 | Basset | G06F 3/013 |

OTHER PUBLICATIONS

International Searching Authority, Patent Cooperation Treaty, Written Opinion of the International Searching Authority, European Application No. PCT/US2021/014970, dated Apr. 15, 2021, 5 pages.

International Searching Authority, Patent Cooperation Treaty, Written Opinion of the International Searching Authority, European Application No. PCT/US2020/063513, dated Feb. 18, 2021, 9 pages.

International Searching Authority, Patent Cooperation Treaty, Written Opinion of the International Searching Authority, European Application No. PCT/US2021/014693, dated Mar. 12, 2021, 12 pages.

* cited by examiner

DUAL WAVELENGTH EYE IMAGING

BACKGROUND INFORMATION

Capturing images of an eye is useful in a variety of contexts. Images of the eye may be analyzed to determine a position of the eye, a size of the pupil, and/or where the eye is gazing. Eye imaging systems vary with regard to the speed and accuracy of imaging the eye. Some eye imaging systems require extensive calibration to operate with accuracy. Reducing or eliminating calibration time or complexity of eye imaging is desirable. The speed and accuracy of eye imaging systems may also be improved.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of dual wavelength eye imaging are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

This disclosure is directed to stereo imaging of one or more eyes with two different wavelengths. The embodiments of the disclosure may be used in a variety of contexts including in head mounted devices for eye-tracking purposes, for example. In aspects of the disclosure, a first array of illuminators emits a first near-infrared light (e.g. 850 nm) toward and eye and a second array of illuminators emits a second near-infrared light (e.g. 940 nm) toward the eye. An optical combiner in a near-eye optical element may be configured to direct the first near-infrared light (reflected/scattered from the eye) and the second near-infrared light (also reflected/scattered from the eye) to a camera module that generates first ocular images (from the first near-infrared light) and second ocular images (from the second near-infrared light). Analyzing the first ocular images of the first near-infrared wavelength and the second ocular images of the second near-infrared wavelength may allow for greater eye imaging accuracy, particularly in the z-dimension (depth). This increased accuracy improves tracking positions of the eye and calibration processes related to eye position tracking may be reduced or eliminated. Furthermore, determining the gaze area of the eye (where the eye is gazing) may be reduced by a factor of three or more to more precisely define where an eye is gazing. These and other embodiments are described in more detail in connection with FIGS. 1-10.

Figure 1:
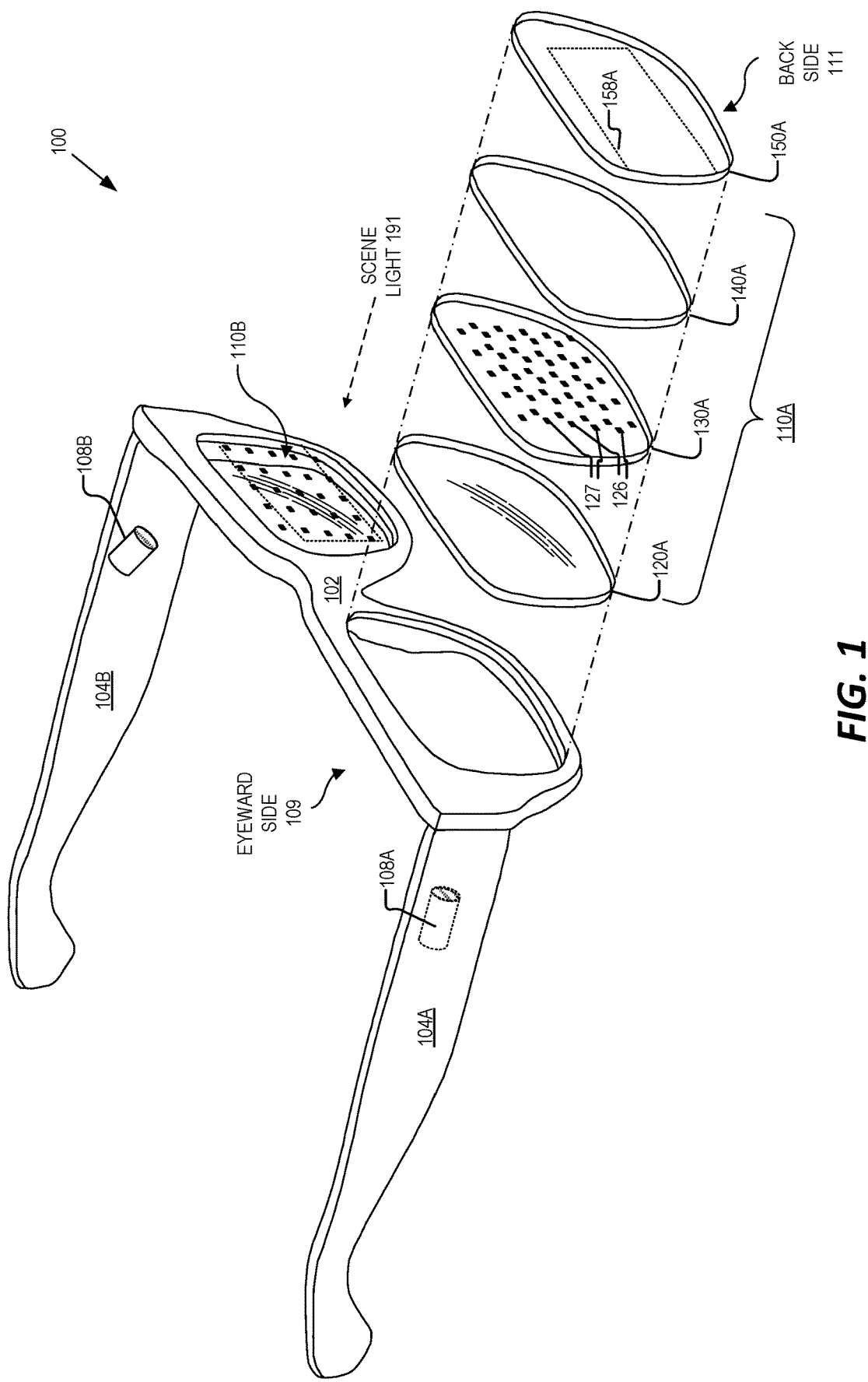
FIG. 1 illustrates an example head mounted display (HMD), in accordance with aspects of the disclosure.

FIG. 1 illustrates an example head mounted display (HMD) 100, in accordance with aspects of the present disclosure. Although an HMD is illustrated in FIG. 1, embodiments of the disclosure may be used in a variety of contexts including in head mounted devices that do not include a display. The illustrated example of HMD 100 is shown as including a frame 102, temple arms 104A and 104B, and near-eye optical elements 110A and 110B. Camera modules 108A and 108B are shown as coupled to temple arms 104A and 104B, respectively. FIG. 1 also illustrates an exploded view of an example of near-eye optical element 110A. Near-eye optical element 110A is shown as including an optional optically transparent layer 120A, an illumination layer 130A, an optical combiner layer 140A, and a display layer 150A. Display layer 150A may include a waveguide 158 that is configured to direct virtual images to an eye of a user of HMD 100.

Illumination layer 130A is shown as including a plurality of illuminators 126 and 127. Illuminators 126 and 127 may be described as "in-field" because they are in a field of view (FOV) of a user of the HMD 100. In-field illuminators 126 and 127 may be in a same FOV that a user views a display of the HMD, in an embodiment. In-field illuminators 126 and 127 may be in a same FOV that a user views an external environment of the HMD 100 via scene light 191 propagating through near-eye optical elements 110. While in-field illuminators 126 and 127 may introduce minor occlusions into the near-eye optical element 110A, the in-field illuminators 126 and 127, as well as their corresponding electrical routing may be so small as to be unnoticeable or insignificant to a wearer of MD 100. Additionally, any occlusion from in-field illuminators 126 and 127 will be placed so close to the eye as to be unfocusable by the human eye and therefore assist in the in-field illuminators 126 and 127 being not noticeable or insignificant. In some embodiments, each in-field illuminator 126 or 127 has a footprint (or size) that is less than about 200×200 microns. When HMD 100 is being worn by a user, the in-field illuminators 126 and 127 may be disposed between 10 mm and 30 mm from the eye. In some embodiments, the in-field illuminators 126 and 127 may be placed between 15 mm and 25 mm from the eye of a user. The in-field illuminators 126 and 127 may emit non-visible light to toward an eye region. The non-visible light may be near-infrared light (e.g. 750 nm-1.5 μm), in some embodiments. Illuminators 126 emit a first non-visible wavelength and illuminators 127 emit a second non-visible wavelength that has a different wavelength than the first non-visible wavelength. Each in-field illuminator 126 and 127 may be a micro light emitting diode (micro-LED), an edge emitting LED, a vertical cavity surface emitting laser (VCSEL) diode, or a Superluminescent diode (SLED).

As shown in FIG. 1, frame 102 is coupled to temple arms 104A and 104B for securing the HMD 100 to the head of a user. Example HMD 100 may also include supporting hardware incorporated into the frame 102 and/or temple arms 104A and 104B. The hardware of HMD 100 may include any of processing logic, wired and/or wireless data interface for sending and receiving data, graphic processors, and one or more memories for storing data and computer-executable instructions. In one example, HMD 100 may be configured to receive wired power and/or may be configured to be powered by one or more batteries. In addition, HMD 100 may be configured to receive wired and/or wireless data including video data.

FIG. 1 illustrates near-eye optical elements 110A and 110B that are configured to be mounted to the frame 102. In some examples, near-eye optical elements 110A and 110B may appear transparent to the user to facilitate augmented reality or mixed reality such that the user can view visible scene light 191 from the environment while also receiving display light directed to their eye(s) by way of display layer 150A. In further examples, some or all of near-eye optical elements 110A and 110B may be incorporated into a virtual reality headset where the transparent nature of the near-eye optical elements 110A and 110B allows the user to view an electronic display (e.g., a liquid crystal display (LCD), an organic light emitting diode (OLED) display, a micro-LED display, etc.) incorporated in the virtual reality headset.

As mentioned above, the in-field illuminators 126 and 127 of the illumination layer 130A may be configured to emit non-visible illumination light towards the eyeward side 109 of the near-eye optical element 110A to illuminate the eye of a user. The near-eye optical element 110A is shown as including optical combiner layer 140A where the optical combiner layer 140A is disposed between the illumination layer 130A and a backside 111 of the near-eye optical element 110A. In some aspects, the optical combiner 140A is configured to receive first reflected light (having the wavelength emitted by the first illuminators 126) that is reflected/scattered by the eye of the user and to direct the first reflected light to the camera module 108A. The optical combiner 140A may also be configured to receive second reflected light (having the wavelength emitted by the second illuminators 127) that is reflected/scattered by the eye of the user and direct the second reflected light to the camera module 108A. Optical combiner 140A may have a first layer configured to direct the first reflected light and a second layer to reflect the second reflected light. The camera module 108A may be located in different positions than the positions illustrated. In some aspects, the optical combiner 140A is transmissive to visible light (e.g. approximately 400 nm-700 nm), such as scene light 191 incident on the backside 111 of the near-eye optical element 110A. In some examples, the optical combiner 140A may be configured as a holographic optical element (HOE) or a volume hologram that may include one or more Bragg gratings for directing the first reflected light and the second reflect light toward the camera module 108A. In some examples, the optical combiner 140A includes a polarization-selective volume hologram (a.k.a. polarized volume hologram) that diffracts (in reflection) a particular polarization orientation of incident light having a particular wavelength toward camera module 108A while passing other polarization orientations.

Display layer 150A may include one or more other optical elements depending on the design of the HMD 100. For example, display layer 150A may include a waveguide 158 to direct display light generated by an electronic display to the eye of the user. In some implementations, at least a portion of the electronic display is included in the frame 102 of the HMD 100. The electronic display may include an LCD, an organic light emitting diode (OLED) display, micro-LED display, pico-projector, or liquid crystal on silicon (LCOS) display for generating the display light.

Optically transparent layer 120A is shown as being disposed between the illumination layer 130A and the eyeward side 109 of the near-eye optical element 110A. The optically transparent layer 120A may receive the infrared illumination light emitted by the illumination layer 130A and pass the infrared illumination light to illuminate the eye of the user. As described previously, the optically transparent layer 120A may also be transparent to visible light, such as scene light 191 received from the environment and/or display light received from the display layer 150A. In some examples, the optically transparent layer 120A has a curvature for focusing light (e.g., display light and/or scene light) to the eye of the user. Thus, the optically transparent layer 120A may, in some examples, may be referred to as a lens. In some aspects, the optically transparent layer 120A has a thickness and/or curvature that corresponds to the specifications of a user. In other words, the optically transparent layer 120A may be a prescription lens. However, in other examples, the optically transparent layer 120A may be a non-prescription lens.

Figure 2:
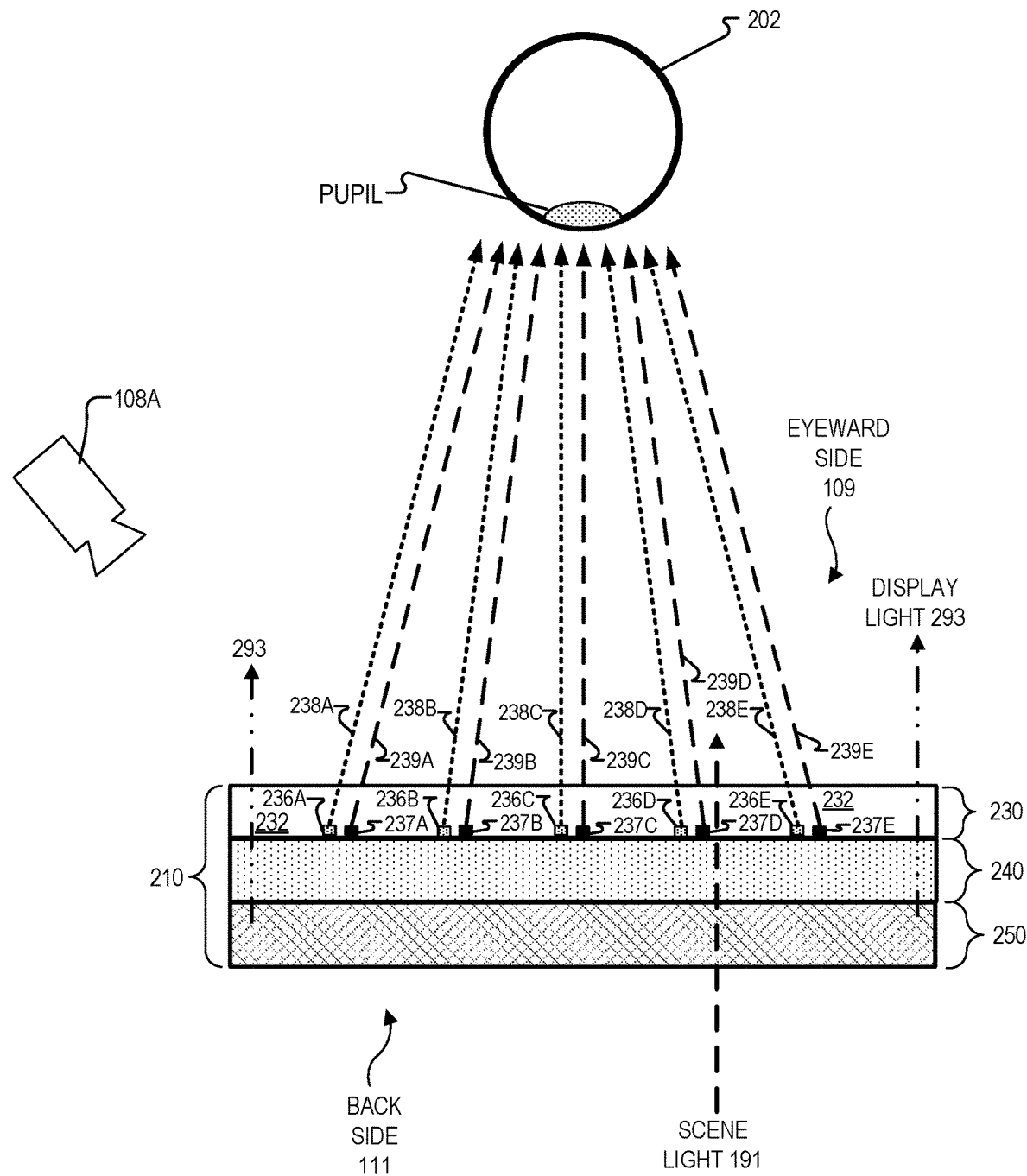
FIG. 2 is a top view of an example near-eye optical element that includes an illumination layer, in accordance with an embodiment of the disclosure.

FIG. 2 is atop view of an example near-eye optical element 210 that includes an illumination layer 230, a combiner layer 240, and a display layer 250. A transparent layer (not illustrated) may optionally be included between illumination layer 230 and eye 202, in some embodiments. First illuminators 236 emit first non-visible illumination light 238 to an eye region to illuminate eye 202. In FIG. 2, illuminators 236A, 236B, 236C, 236D, and 236E are illustrated although there may be more or fewer illuminators in illumination layer 230. Second illuminators 237 emit second non-visible illumination light 239 to an eye region to illuminate eye 202. In FIG. 2, illuminators 237A, 237B, 237C, 237D, and 237E are illustrated although there may be more or fewer illuminators in illumination layer 230. The first non-visible illumination light 238 is a different wavelength than second non-visible illumination light 239. The first non-visible illumination light 238 and the second non-visible illumination light 239 may be near-infrared light, in some aspects.

As described above, illuminators 236 and 237 may be VCSELs or SLEDs, and consequently illumination light 238/239 may be narrowband infrared illumination light (e.g. linewidth of 1-10 nm). As will be described in greater detail below, the reflected illumination light that is reflected by eye 202 may be received by combiner layer 240 and redirected to camera module 108A.

Camera module 108A generates first and second ocular images where the first ocular images are of the first non-visible illumination light 238 and the second ocular images are of the second non-visible illumination light 239. These first ocular images and second ocular images may be utilized to determine a position of eye 202 and/or a gaze direction of eye 202, for example. Camera module 108A may be configured to filter out light that is other than the first non-visible illumination light and the second non-visible illumination light so that camera module 108A only images the wavelength of the first non-visible illumination light 238 and the second non-visible illumination light 239.

FIG. 2 shows that scene light 191 (visible light) from the external environment may propagate through display layer 250, combiner layer 240, and illumination layer 230 to become incident on eye 202 so that a user can view the scene of an external environment. FIG. 2 also shows that display layer 250 may generate or redirect display light 293 to present virtual images to eye 202. Display light 293 is visible light and propagates through combiner layer 240 and illumination layer 230 to reach eye 202.

Illumination layer 230 may include a transparent substrate that the in-field illuminators 237 are disposed on. The in-field illuminators 237 may also be encapsulated in a transparent material 232. Transparent material 232 is configured to transmit visible light (e.g. 400 nm-750 nm) and near-infrared light (e.g. 750 nm-1.5 μm).

Figure 3:
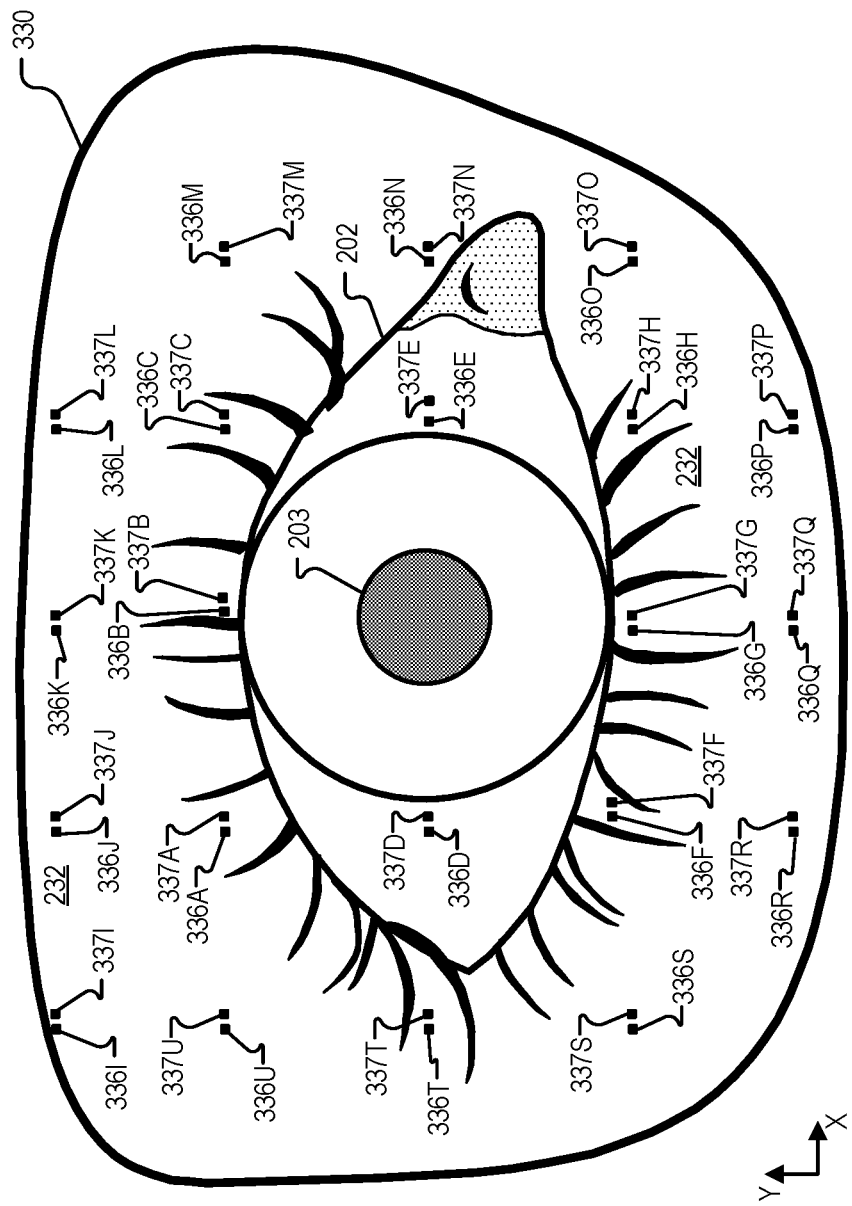
FIG. 3 illustrates a front view of an eye through an example illumination layer, in accordance with aspects of the disclosure.

FIG. 3 illustrates a front view of eye 202 through an example illumination layer 330, in accordance with aspects of the disclosure. In the illustrated embodiment, illumination layer 330 include twenty-one first in-field illuminators (336A-336U) and twenty-one second in-field illuminators (337A-337U). In the illustrated example of FIG. 3, each first in-field illuminator 336 is disposed quite close to a corresponding second in-field illuminator 337. However, other arrangements of the first in-field illuminators 336 and second in-field illuminators 337 are contemplated. While not specifically illustrated, transparent or semi-transparent electrical traces may provide electrical power to the first in-field illuminators 336 and second in-field illuminators 337. In some embodiments, a transparent semiconductor material such as indium tin oxide (ITO) is used as the electrical traces. Corresponding electrical circuitry (e.g. transistors and power supply) to selectively activate first in-field illuminators 336 and second in-field illuminators 337 may be included in the frame 102 or arms 104 of a head mounted device. The first in-field illuminators 336 and second in-field illuminators 337 may share a common ground or a common power rail to reduce the electrical traces required to be run across illumination layer 330.

Figure 4:
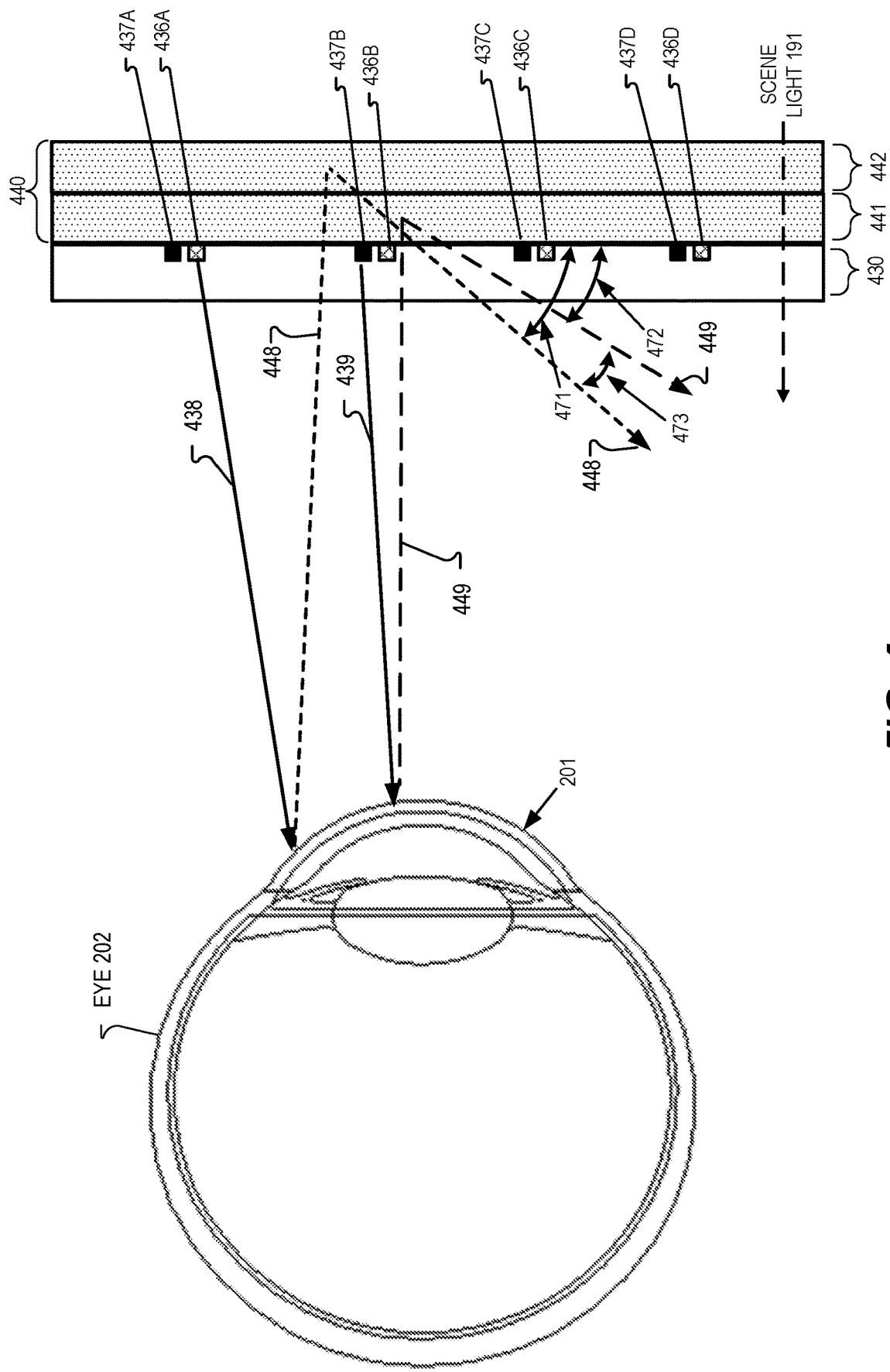
FIG. 4 illustrates example optical paths of first non-visible illumination light and second non-visible illumination light, in accordance with aspects of the disclosure.

FIG. 4 illustrates example optical paths of first non-visible illumination light 438 and second non-visible illumination light 439, in accordance with aspects of the disclosure. In FIG. 4, an array of first illuminators 436 is configured to emit first non-visible illumination light 438 to illuminate eye 202. Only the illumination light from illuminator 436A is shown for illustration and description of the optical path of the illumination light, in FIG. 4, although all of the first illuminators 436 emit first non-visible illumination light 438. At least a portion of first non-visible illumination light 438 reflects off the cornea 201 as first reflected light 448 and propagates through illumination layer 430 and encounters combiner optical element 440.

Similarly to the illustration of first non-visible illumination light 438 of FIG. 4, an array of second illuminators 437 is configured to emit second non-visible illumination light 439 to illuminate eye 202. Only the illumination light from illuminator 437B is shown for illustration and description of the optical path of the illumination light although all of the second illuminators 437 emit second non-visible illumination light 439. At least a portion of second non-visible illumination light 439 reflects off the cornea 201 as second reflected light 449 and propagates through illumination layer 430 and encounters combiner optical element 440. Second reflected light 449 propagates through first combiner layer 441 before encountering second combiner layer 442.

Combiner optical element 440 receives first reflected light 448 and second reflected light 449 and redirects the light 448 and 449 to a camera module (e.g. camera module 108). In FIG. 4, combiner optical element 440 includes a first combiner layer 441 and a second combiner layer 442. First combiner layer 441 is configured to pass visible scene light (e.g. scene light 191) to eye 202 and direct the first reflected light 448 (having the same wavelength as light 438) to the camera module (not illustrated in FIG. 4). First combiner layer 441 may include a wavelength selective diffractive structure specifically configured to redirect the wavelength of light 438/448. Second combiner layer 442 is configured to pass visible scene light (e.g. scene light 191) to eye 202 and direct the second reflected light 449 (having the same wavelength as light 439) to the camera module. Second combiner layer 442 may include a wavelength selective diffractive structure specifically configured to redirect the wavelength of light 439/449.

First combiner layer 441 may be a holographic optical element (HOE). First combiner layer 441 may include a polarization-selective volume hologram that reflects a first polarization orientation (e.g. right-hand circularly polarized light) of the first reflected light 448 and passes polarization orientations that are other than the first polarization orientation. First combiner layer 441 may also include a folding mirror or linear diffractive grating to redirect first reflected light 448. First combiner layer 441 may be an HOE. Second combiner layer 442 may include a polarization-selective volume hologram that reflects a first polarization orientation (e.g. right-hand circularly polarized light) of the second reflect light 449 and passes polarization orientations that are other than the first polarization orientation. Second combiner layer 442 may also include a folding mirror or linear diffractive grating to redirect second reflected light 449. In the illustrated example of FIG. 4, first combiner layer 441 is disposed between illumination layer 430 and second combiner layer 442.

First combiner layer 441 may selectively redirect the first reflected light 448 to the camera module at a first angle 471 and second combiner layer 442 may selectively redirect the second reflected light 449 to the camera module at a second angle 472 different from the first angle 471. The first angle 471 may be more than 10 degrees greater than the second angle 472, in some aspects. The first angle 471 may be more than 30 degrees greater than the second angle 472, in some aspects. The first angle 471 may be approximately 40 degrees greater than the second angle 472, in some aspects.

Figure 5:
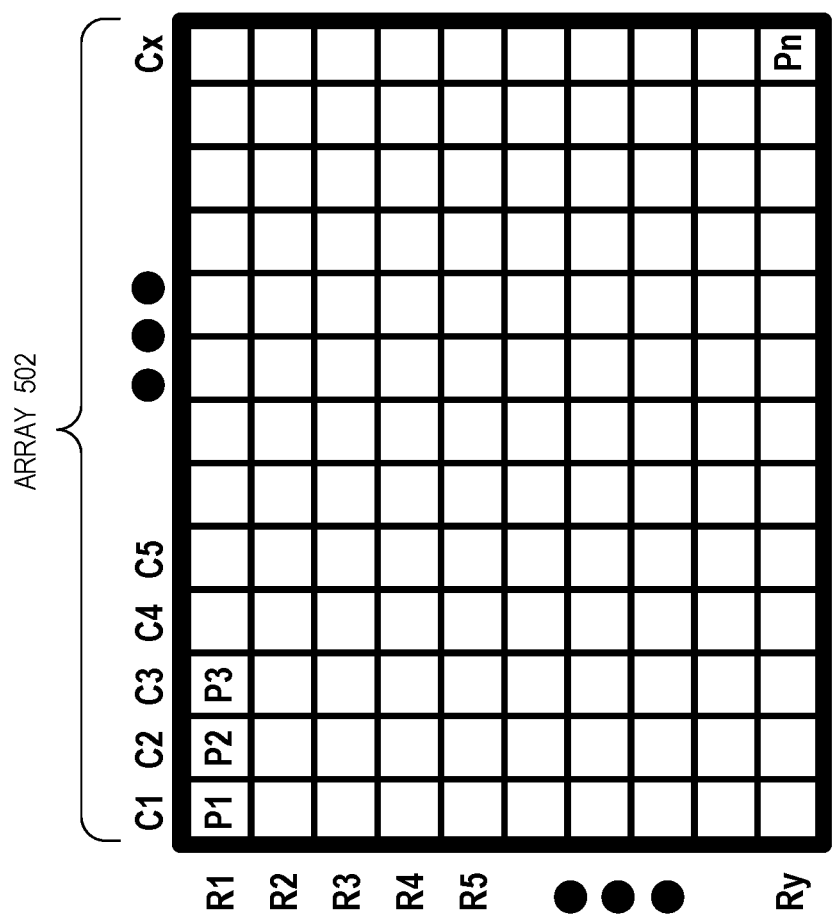
FIG. 5 illustrates an example image sensor that includes an image pixel array, in accordance with aspects of the disclosure.

FIG. 5 illustrates an example image sensor 500 that includes an image pixel array 502. Image sensor 500 may include other electronics that are not specifically illustrated (e.g. readout circuitry). Image sensor 500 may be a complementary metal-oxide semiconductor (CMOS) image sensor. Image pixel array 502 include an array of numeral n image pixels P1, P2, P3 . . . Pn. Image pixel array 502 is arranged in numeral x columns and numeral y rows.

Figure 6:
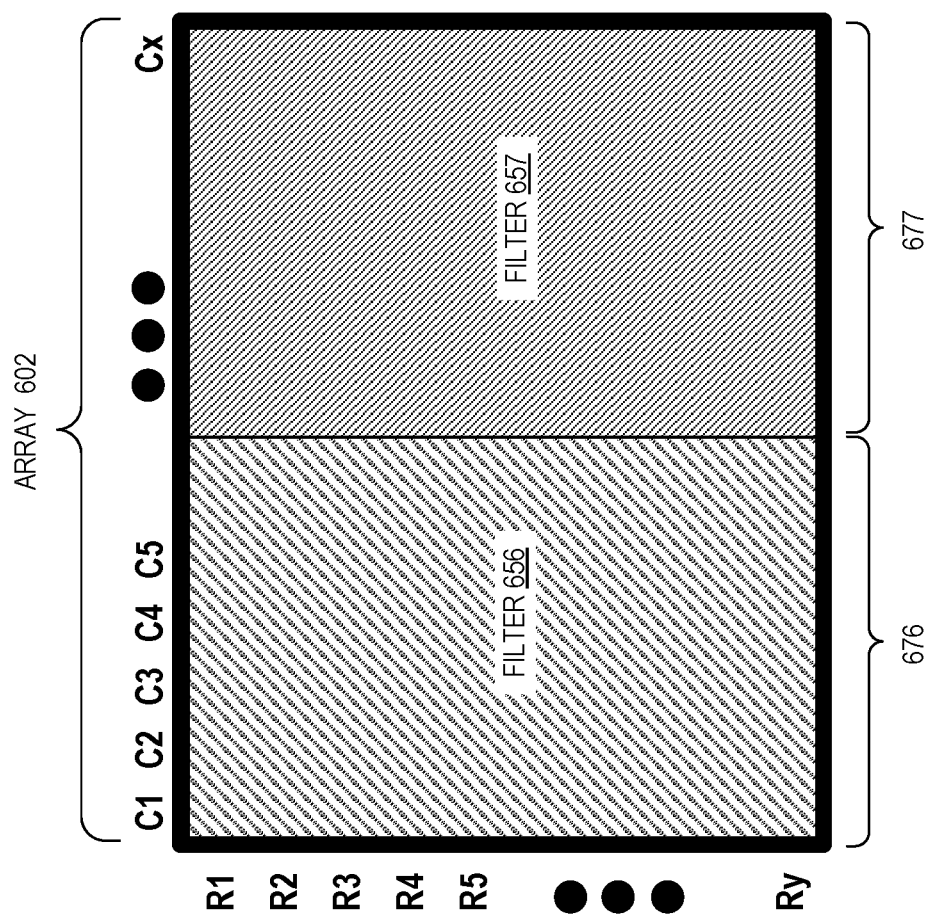
FIG. 6 illustrates an image sensor that may be used in a camera module, in accordance with aspects of the disclosure.

FIG. 6 illustrates an image sensor 600 that may be used in a camera module, in accordance with aspects of the disclosure. Image sensor 600 includes image pixel array 602 that may be configured similarly to image pixel array 502. First filter 656 overlays first pixels of image pixel array 602 that are included in a camera module such as camera module 108. First filter 656 passes (transmits) the wavelength of the first non-visible illumination light (e.g. 438) and rejects other wavelengths of light. Hence, the wavelength emitted by first illuminators 436 that is eventually incident upon the camera module as first reflected light 448 is passed by first filter 656 to the first pixels of image pixel array 602. First filter 656 may be a bandpass filter with a transmission notch that is less the 10 nm, for example. Second filter 657 overlays second pixels of image pixel array 602 that are included in a camera module such as camera module 108. Second filter 657 passes (transmits) the wavelength of the second non-visible illumination light (e.g. 439) and rejects other wavelengths of light. Second filter 657 may be a bandpass filter with a transmission notch that is less the 10 nm, for example. Hence, the wavelength emitted by second illuminators 437 that is eventually incident upon the camera module as second reflected light 449 is passed by second filter 657 to the second pixels of image pixel array 602.

Figure 7:
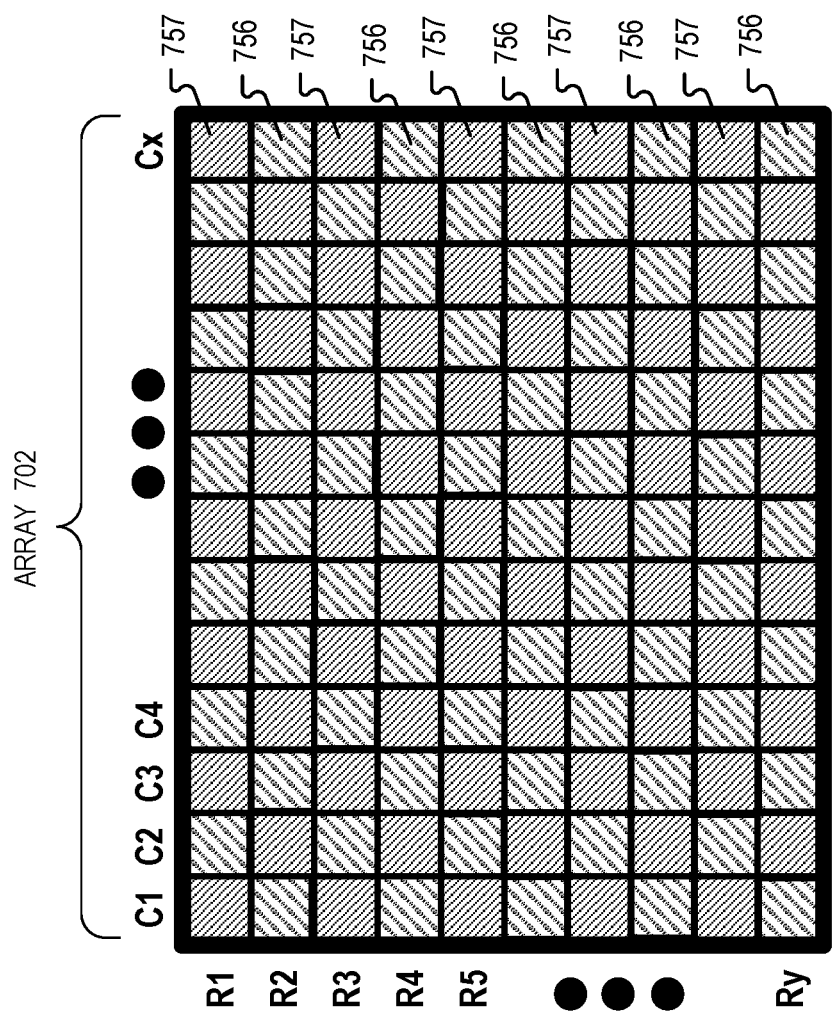
FIG. 7 illustrates first filters interspersed with second filters that may be used in a camera module, in accordance with aspects of the disclosure.

FIG. 7 illustrates first filters 756 interspersed with second filters 757 that may be used in a camera module, in accordance with aspects of the disclosure. Image sensor 700 of FIG. 7 includes image pixel array 702 that may be configured similarly to image pixel array 502. In FIG. 7, first filters 756 overlay first pixels of image pixel array 702 and second filters 757 overlay second pixels of image pixel array 702. Accordingly, the first pixels of image pixel array 702 are interspersed with the second pixels of image pixel array 702. In FIG. 7, first pixels and first filters 756 are arranged in an every-other or nearest-neighbor relationship to the second pixels and second filters 757. First filters 756 pass (transmit) the wavelength of the first non-visible illumination light (e.g. 438) and reject (block) other wavelengths of light. Hence, the wavelength emitted by first illuminators 436 that is eventually incident upon the camera module as first reflected light 448 is passed by first filters 756 to the first pixels of image pixel array 702. First filters 756 may be a bandpass filter with a transmission notch that is less the 10 nm, for example. Second filters 757 overlay second pixels of image pixel array 702 that are included in a camera module such as camera module 108. Second filters 757 pass (transmit) the wavelength of the second non-visible illumination light (e.g. 439) and reject (block) other wavelengths of light. Second filters 757 may be a bandpass filter with a transmission notch that is less the 10 nm, for example. Hence, the wavelength emitted by second illuminators 437 that is eventually incident upon the camera module as second reflected light 449 is passed by second filters 757 to the second pixels of image pixel array 702, in some examples.

In the embodiments illustrated in FIGS. 6 and 7, image pixel array 602 or image pixel array 702 may capture a combined image in a single image capture (that is, in a single global shutter integration period or a single rolling shutter integration period) where the combined image includes a first ocular image generated by the first pixels and a second ocular image generated by the second pixels. Although FIGS. 6 and 7 illustrate example arrangements with respect to first filters overlaying first pixels and second filters overlaying second pixels, other arrangements may also be used in accordance with aspects of the disclosure.

Figure 8:
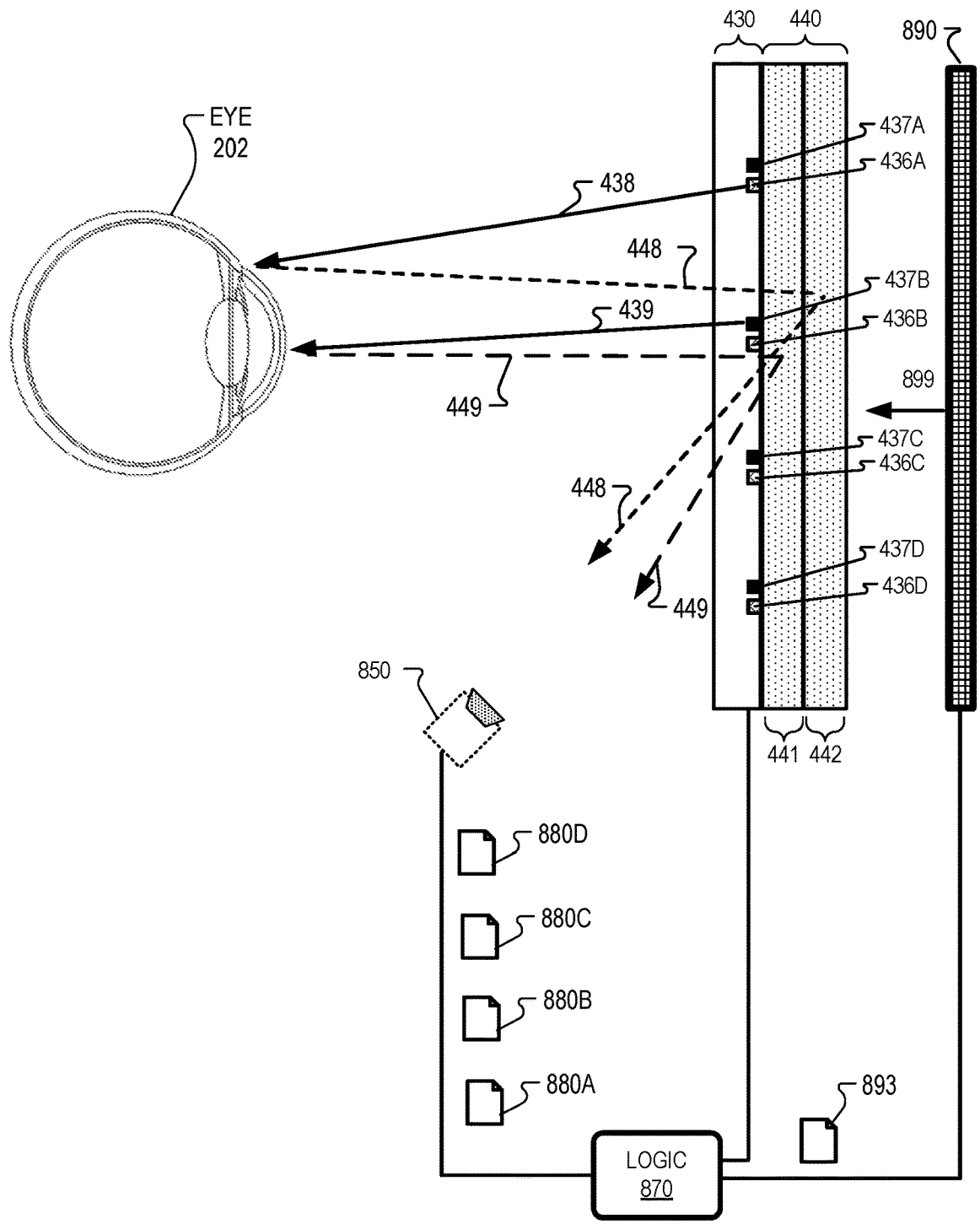
FIG. 8 illustrates a stereo eye imaging system where the camera module captures combined images that include a first ocular image of a first non-visible wavelength and a second ocular image of a second non-visible wavelength, in accordance with aspects of the disclosure.

FIG. 8 illustrates a stereo eye imaging system 800 where camera module 850 captures combined images 880 that include a first ocular image of the first non-visible wavelength and a second ocular image of the second non-visible wavelength, in accordance with aspects of the disclosure. System 800 includes camera module 850, processing logic 870, display layer 890, illumination layer 430, and optical combiner layer 440. Illumination layer 430 includes first illuminators 436 and second illuminators 437. Camera module 850 may include image sensors 600 or 700.

In operation, first illuminators 436 emit first non-visible light 438 toward eye 202 and second illuminators 437 emit second non-visible light 439 toward eye 202. Logic 870 may drive first illuminators 436 and second illuminators 437 to illuminate eye 202 with first non-visible light 438 and second non-visible light 439 simultaneously. First non-visible light 438 may be infrared light. First non-visible light 438 may be near-infrared light. First non-visible light 438 may be near-infrared light between 700 nm and 1000 nm, in some aspects. First non-visible light 438 may be narrowband light having a linewidth of less than 10 nm. Second non-visible light 439 may be infrared light. Second non-visible light 439 may be near-infrared light. Second non-visible light 439 may be near-infrared light between 700 nm and 1000 nm, in some aspects. Second non-visible light 439 may be narrowband light having a linewidth of less than 10 nm. A portion of first non-visible light 438 reflects off of the cornea of eye 202 as first reflected light 448 that encounters first combiner layer 441. First combiner layer 441 redirects first reflected light 448 to camera module 850. First combiner layer 441 may redirect, by way of diffraction, first reflected light 448 to camera module 850. A portion of second non-visible light 439 reflects off of the cornea of eye 202 as second reflected light 449 that encounters second combiner layer 442. Second combiner layer 442 redirects second reflected light 449 to camera module 850. Second combiner layer 442 may redirect, by way of diffraction, second reflected light 449 to camera module 850.

Camera module 850 receives first reflected light 448 and second reflected light 449 and camera module 850 captures a combined image 880 that includes both first reflect light 448 and second reflected light 449. First illuminators 436 and second illuminators 437 emit first non-visible light 438 and second non-visible light 439 simultaneously in some aspects so that first reflected light 448 and second reflected light 449 is incident on an image sensor of camera module 850 simultaneously. First pixels of the image sensor of camera module 850 capture first reflected light 448 and second pixels of the image sensor capture second reflected light 449 in the same combined image 880. Since the first pixels are overlaid with a first filter (e.g. 656 or 756), only the wavelength of light 438/448 is imaged by the first pixels. Similarly, since the second pixels are overlaid with a second filter (e.g. 657 or 757), only the wavelength of light 439/449 is imaged by the second pixels. The combined image 880 includes both a first ocular image generated by the first pixels and a second ocular image generated by the second pixels.

FIG. 8 shows that a plurality of combined images 880 may be captured sequentially as combined images 880A, 880B, 880C, and 880D. Eye-tracking positions of eye 202 may be calculated based on the first ocular image and second ocular image extracted from combined images 880. For example, a first eye-tracking position of eye 202 may be determined from a first ocular image and a second ocular image of combined image 880A. A second eye-tracking position of eye 202 may be determined from a first ocular image and a second ocular image of combined image 880B, a third eye-tracking position of eye 202 may be determined from a first ocular image and a second ocular image of combined image 880C, and a fourth eye-tracking position of eye 202 may be determined from a first ocular image and a second ocular image of combined image 880D. In this way, a position of eye 202 may be continuously tracked.

In the illustration of FIG. 8, processing logic 870 is configured to receive combined images 880. Processing logic 870 may extract the first ocular images and the second ocular images from the combined images and determine the eye-tracking positions. In some embodiments, a gaze direction of eye 202 may be determined from the eye-tracking positions determined from combined images 880. Based on the gaze direction, a virtual image presented to the user by display layer 890 may be changed. In FIG. 8, processing logic 870 may drive a virtual image 893 onto display layer 890 based on gaze direction derived from the first and second ocular images of the combined images 880. Virtual image 893 is included in display light 899 presented to eye 202. Display light 899 propagates through optical combiner layer 440 and illumination layer 430, in example system 800.

Figure 9A:
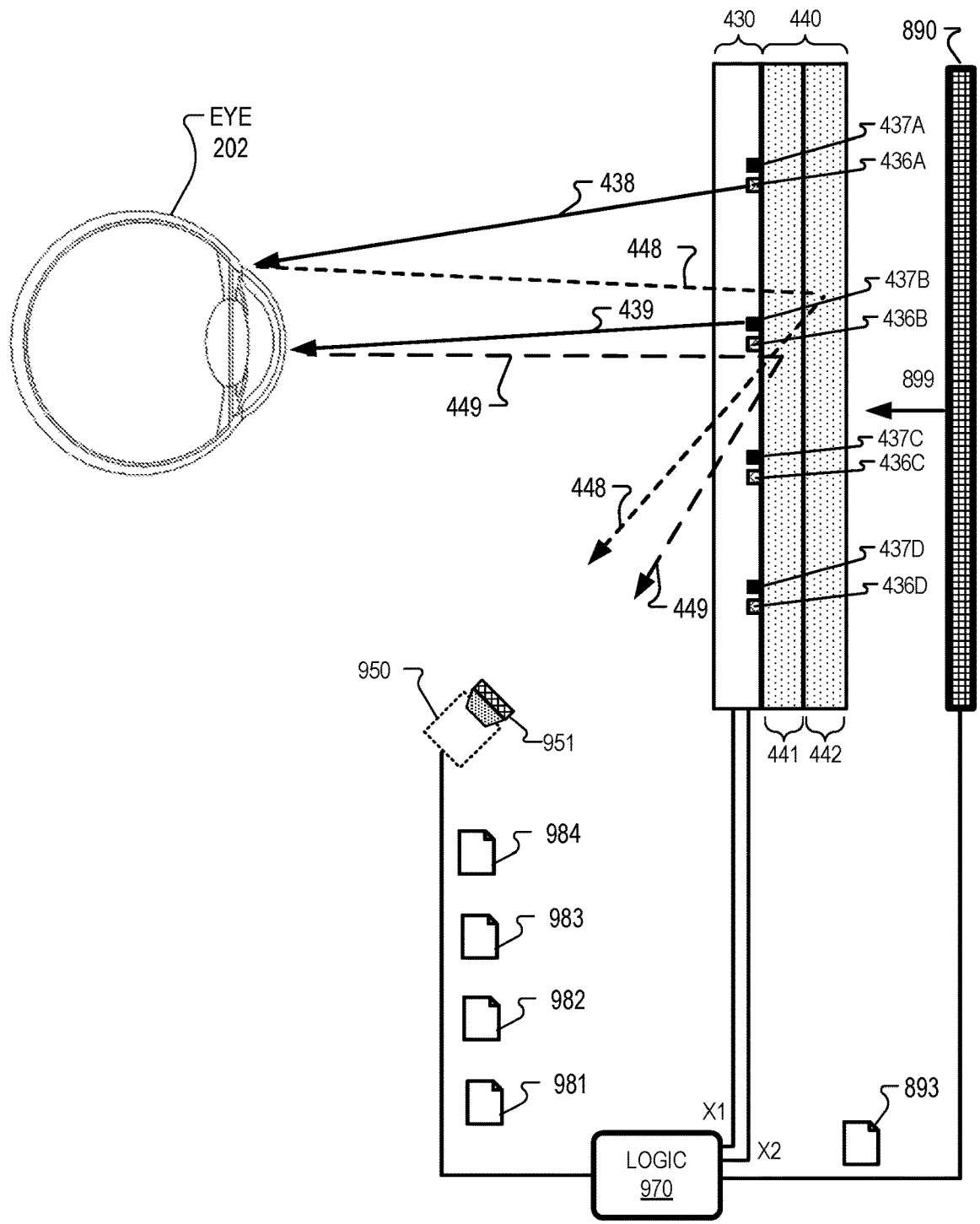
FIG. 9A illustrates a stereo eye imaging system where a camera module captures a first ocular image and a second ocular image in different image captures, in accordance with aspects of the disclosure.

FIG. 9A illustrates a stereo eye imaging system 900 where camera module 950 captures a first ocular image and a second ocular image in different image captures, in accordance with aspects of the disclosure. System 900 includes camera module 950, processing logic 970, display layer 890, illumination layer 430, and optical combiner layer 440. Illumination layer 430 includes first illuminators 436 and second illuminators 437. The illustrated camera module 950 includes a filter 951 configured to filter out light that has a wavelength that is other than the wavelength of light 438/448 and filter out light that has a wavelength that is other than the wavelength of light 439/449. Filter 951 may include multiple dielectric layers. In an example embodiment where first illuminators 436 emit narrowband light centered around 850 nm and second illuminators 437 emit narrowband light centered around 940 nm, filter 951 may pass light having wavelengths from 849 nm to 851 nm and pass light having wavelengths from 939 nm to 941 nm and block all other wavelengths from becoming incident upon an image sensor of camera module 950. In this example, an image sensor such as image sensor 500 may be used in camera module 950. In an example, filter 951 is disposed over a lens assembly of camera module 950. In other examples, a filter having the characteristics of filter 951 may be overlaid over the image pixels of image pixel array 502 so that the filter is disposed between the image pixel array and a lens assembly configured to focus images to an imaging plane of the image pixel array.

Figure 9B:
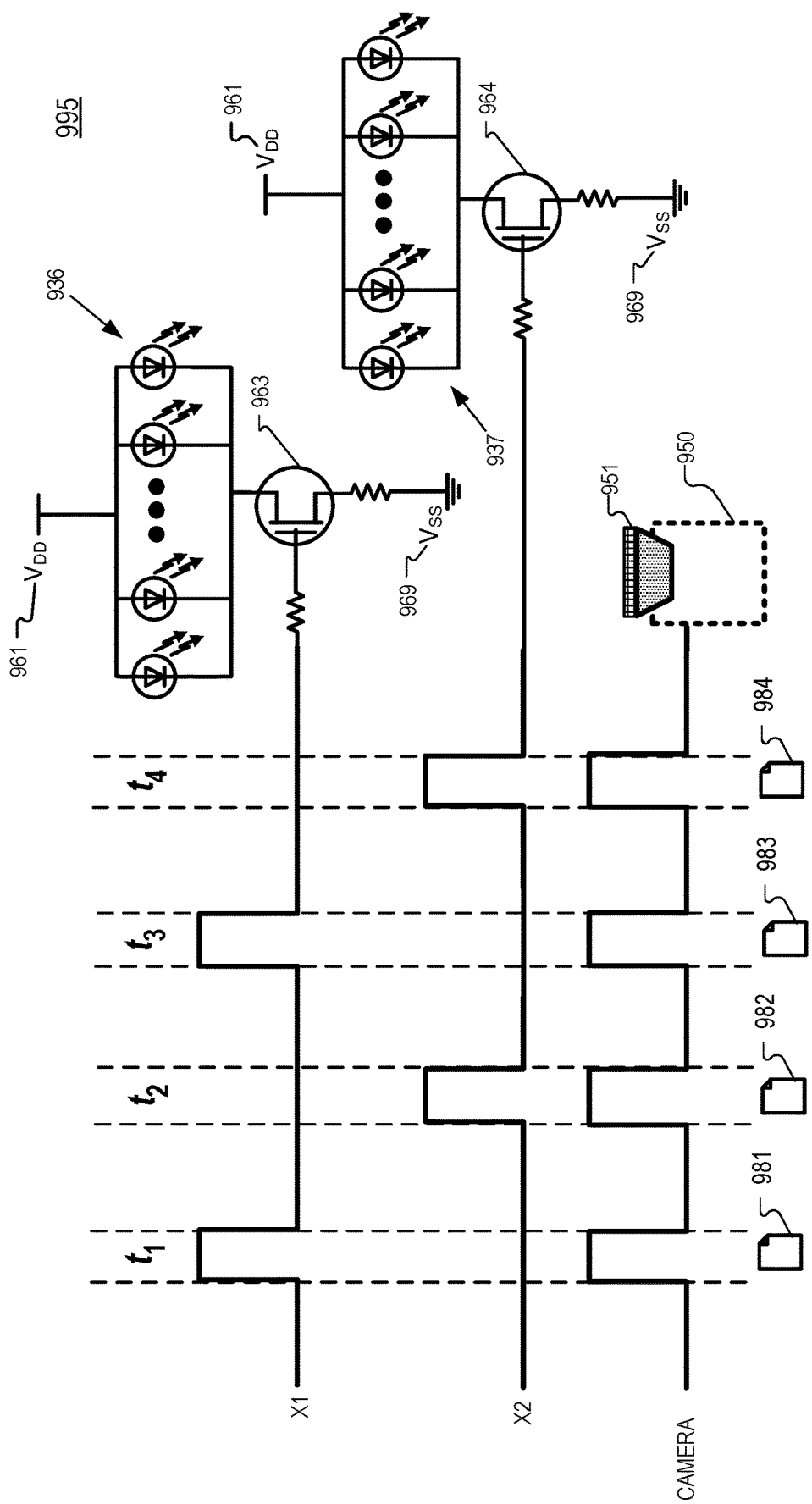
FIG. 9B illustrates an example hybrid schematic-timing diagram illustrating an example operation technique of a system, in accordance with aspects of the disclosure.

FIG. 9B illustrates an example hybrid schematic-timing diagram 995 illustrating an example operation technique of system 900, in accordance with aspects of the disclosure. At time period $t_1$, processing logic 970 selectively drives output X1 so that first illuminators emit first non-visible light 438 toward eye 202. FIG. 9B shows example first illuminators 936 that are illustrated as diodes that may be used as first illuminators 436. In the example schematic of FIG. 9B, when output X1 is high, transistor 963 is turned on which allows electrical current to flow through first illuminators 936 causing emission of first non-visible light 438. In the illustrated example, first illuminators 936 are arranged in parallel between voltage supply $V_{DD}$ 961 and ground $V_{SS}$ 969. However, in other arrangements, first illuminators 936 may be arranged in one or more strings of diodes arranged in series. The diodes in FIG. 9B could represent LEDs, SLEDs, and laser diodes (including VCSELs), for example.

A portion of first non-visible light 438 that is emitted by first illuminators 436/936 reflects off of the cornea of eye 202 as first reflected light 448 that encounters first combiner layer 441. First combiner layer 441 redirects first reflected light 448 to camera module 950. While first illuminators 436/936 are illuminating eye 202 with first non-visible light 438, camera module 950 initiates an image capture to capture first ocular image 981. Therefore, first ocular image 981 is captured by camera module 950 while first non-visible light 438 is illuminating the eye region of eye 202 and while the second non-visible light 439 is not illuminating the eye region. Processing logic 970 drive output X1 low after time period $t_1$.

At time period $t_2$, processing logic 970 selectively drives output X2 so that second illuminators emit second non-visible light 439 toward eye 202. FIG. 9B shows example second illuminators 937 that are illustrated as diodes that may be used as second illuminators 437. In the example schematic of FIG. 9B, when output X2 is high, transistor 964 is turned on which allows electrical current to flow through second illuminators 937 causing emission of second non-visible light 439. In the illustrated example, second illuminators 937 are arranged in parallel between voltage supply $V_{DD}$ 961 and ground $V_{SS}$ 969. However, in other arrangements, second illuminators 937 may be arranged in one or more strings of diodes arranged in series.

A portion of second non-visible light 439 that is emitted by second illuminators 437/937 reflects off of the cornea of eye 202 as second reflected light 449 that encounters second combiner layer 442. Second combiner layer 442 redirects second reflected light 449 to camera module 950. While second illuminators 437/937 are illuminating eye 202 with second non-visible light 439, camera module 950 initiates an image capture to capture second ocular image 982. Therefore, second ocular image 982 is captured by camera module 950 while second non-visible light 439 is illuminating the eye region of eye 202 and while the first non-visible light 438 is not illuminating the eye region. Processing logic 970 drive output X2 low after time period $t_2$.

At time period $t_3$, processing logic 970 selectively drives output X1 so that first illuminators emit first non-visible light 438 toward eye 202 and first ocular image 983 is captured in a similar way as first ocular image 981. At time period $t_4$, processing logic 970 selectively drives output X2 so that second illuminators emit second non-visible light 439 toward eye 202 and second ocular image 984 is captured in a similar way as second ocular image 982. In this way, system 900 employs a time-multiplexed technique of capturing first ocular images of the wavelength of first non-visible light 438 and capturing second ocular images of the wavelength of second non-visible light 439.

Figure 10:
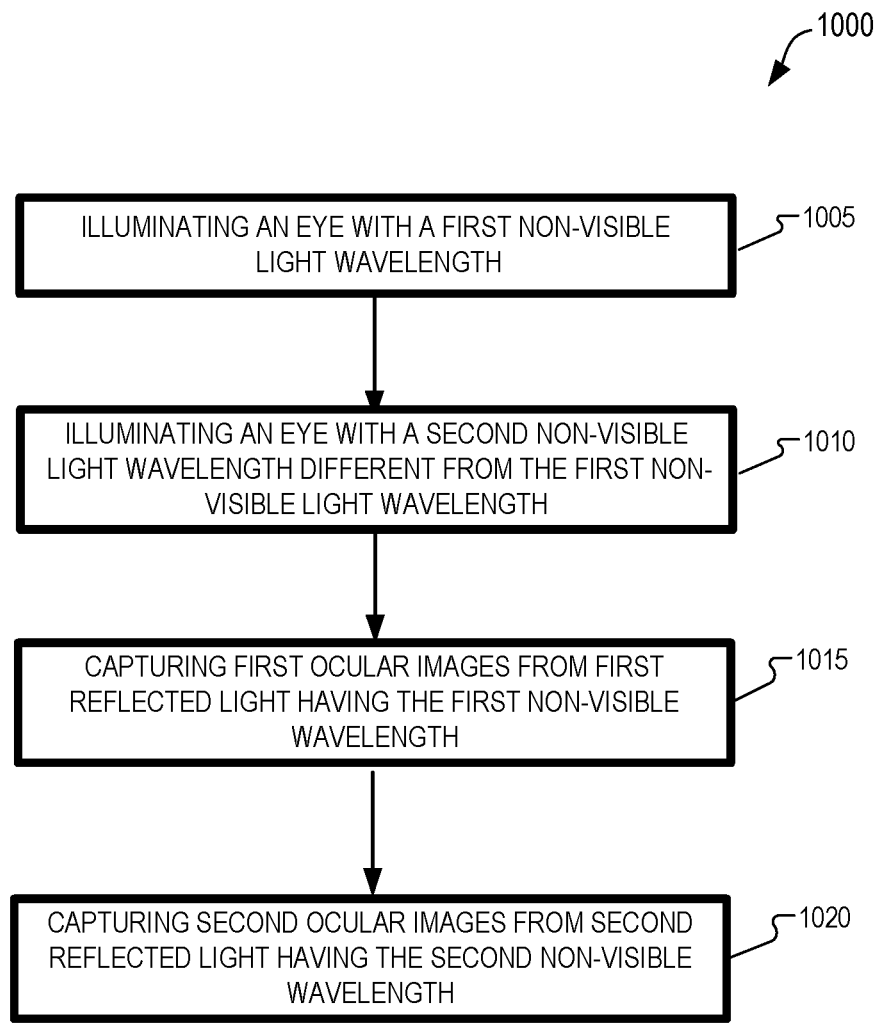
FIG. 10 illustrates a flow chart illustrating an example process for near-eye stereo imaging, in accordance with aspects of the disclosure.

FIG. 10 illustrates a flow chart illustrating an example process 1000 for near-eye stereo imaging, in accordance with aspects of the disclosure. The order in which some or all of the process blocks appear in process 1000 should not be deemed limiting. Rather, one of ordinary skill in the art having the benefit of the present disclosure will understand that some of the process blocks may be executed in a variety of orders not illustrated, or even in parallel.

In process block 1005, an eye is illuminated with a first non-visible light wavelength. The first non-visible light wavelength may be a near-infrared wavelength, for example.

In process block 1010, the eye is illuminated with a second non-visible light wavelength that is different from the first non-visible wavelength. The second non-visible light wavelength may also be a near-infrared wavelength. The first non-visible wavelength may be separated from the first non-visible light wavelength by 30 nm or more, in some examples.

In process block 1015, first ocular images are captured from first reflected light (e.g. light 448) having the first non-visible light wavelength.

In process block 1020, second ocular images are captured from second reflected light (e.g. light 449) having the second non-visible light wavelength. The first ocular images and the second ocular images are captured with a camera (e.g. camera modules 850 or 950) configured to filter out light that is other than the first non-visible light wavelength and the second non-visible light wavelength.

Process 1000 may further includes determining eye-tracking positions based on the first ocular images and the second ocular images.

In an implementation of process 1000, first in-field illuminators emit the first non-visible light wavelength and second in-field illuminators emit the second non-visible light wavelength and the first in-field illuminators and the second in-field illuminators are included in a near-eye optical element (e.g. near-eye optical element 110 or 210) positioned in a field of view (FOV) of a user.

In an implementation of process 1000, the first ocular images are captured by a camera while the first non-visible light wavelength is illuminating the eye region and while the second non-visible light wavelength is not illuminating the eye region and the second ocular images are captured by the camera while the second non-visible light wavelength is illuminating the eye region and while the first non-visible light wavelength is not illuminating the eye region. System 900 may be used in this implementation, for example.

In an implementation of process 1000, the camera that captures the first ocular images and the second ocular images includes first filters overlaying first pixels of the camera and second filters overlaying second pixels of the camera. The first filters pass the first non-visible light wavelength and reject other light and the first ocular images are generated by the first pixels. The second filters pass the second non-visible light wavelength and reject other light and the second ocular images are generated by the second pixels. System 800 may be used in this implementation, for example.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. 870 or 970) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Communication channels may include or be routed through one or more wired or wireless communication utilizing IEEE 802.11 protocols, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A near-eye imaging system comprising:
   first illuminators configured to emit first near-infrared light toward an eye region;
   second illuminators configured to emit second near-infrared light to the eye region, the second near-infrared light being a different wavelength than the first near-infrared light;
   a camera module; and
   a near-eye optical element comprising:
      a first combiner layer configured to pass visible scene-light to the eye region and direct the first near-infrared light reflecting from the eye region to the camera module; and
      a second combiner layer configured to pass the visible scene-light to the eye region and direct the second near-infrared light reflecting from the eye region to the camera module.

2. The near-eye imaging system of claim 1, wherein the camera module is configured to capture a first ocular image of the first near-infrared light and configured to capture a second ocular image of the second near-infrared light, the camera module configured to filter out light that is other than the first near-infrared light and the second near-infrared light.

3. The near-eye imaging system of claim 2, wherein the camera module includes:
   first filters overlaying first pixels of the camera module, wherein the first filters pass the first near-infrared light and reject other light, the first ocular image generated by the first pixels; and
   second filters overlaying second pixels of the camera module, wherein the second filters pass the second near-infrared light and reject other light, the second ocular image generated by the second pixels.

4. The near-eye imaging system of claim 2 further comprising:
   processing logic configured to selectively activate the first illuminators for a first time period and configured to selectively active the second illuminators for a second time period different from the first time period,
   wherein the camera module is configured to capture the first ocular image during the first time period and configured to capture the second ocular image during the second time period.

5. The near-eye imaging system of claim 1, wherein at least one of the first combiner layer and the second combiner layer includes a holographic optical element (HOE).

6. The near-eye imaging system of claim 1, wherein the first combiner layer selectively directs the first near-infrared light incident at a first angle to the camera module, and wherein the second combiner layer selectively directs the second near-infrared light incident at a second angle to the camera module.

7. The near-eye imaging system of claim 6, wherein the first angle is at least 10 degrees greater than the second angle.

8. The near-eye imaging system of claim 1, wherein the first illuminators and the second illuminators are in-field illuminators that are positioned on an illumination layer of the near-eye optical element that is within a field-of-view (FOV) of an eye of a user of the near-eye optical element.

9. The near-eye imaging system of claim 1, wherein the first illuminators and the second illuminators include at least one of a micro light emitting diode (micro-LED), an edge emitting LED, a vertical cavity surface emitting laser (VCSEL) diode, or a Superluminescent diode (SLED).

10. The near-eye imaging system of claim 1, wherein the first near-infrared light is centered around 850 nm and the second near-infrared light is centered around 940 nm.

11. The near-eye imaging system of claim 1, wherein the first combiner layer is configured to pass the second near-infrared light to the second combiner layer.

12. The near-eye imaging system of claim 1, wherein the second combiner layer is configured to receive the second near-infrared light through the first combiner layer, and wherein the second combiner layer is configured to direct the second near-infrared light to the camera module through the first combiner layer.

13. A near-eye optical element comprising:
   first illuminators configured to emit first light having a first non-visible wavelength toward an eye region;
   second illuminators configured to emit second light having a second non-visible wavelength to the eye region, the first non-visible wavelength being different from the second non-visible wavelength;
   a first combiner layer configured to pass visible scene-light to the eye region and direct the first light reflecting from the eye region to a camera module; and
   a second combiner layer configured to pass the visible scene-light to the eye region and direct the second light reflecting from the eye region to the camera module.

14. The near-eye optical element of claim 13, wherein the first combiner layer selectively directs the first light incident at a first angle to the camera module, and wherein the second combiner layer selectively directs the second light incident at a second angle to the camera module.

15. The near-eye optical element of claim 13, wherein at least one of the first combiner layer and the second combiner layer includes a holographic optical element (HOE).

16. The near-eye optical element of claim 13, wherein the first illuminators and the second illuminators are in-field illuminators that are positioned on an illumination layer of the near-eye optical element that is within a field-of-view (FOV) of an eye of a user of the near-eye optical element.

17. A method of near-eye stereo imaging, the method comprising:
   illuminating an eye with a first non-visible light wavelength;
   illuminating the eye with a second non-visible light wavelength different from the first non-visible light wavelength;
   capturing first ocular images from first reflected light having the first non-visible light wavelength; and
   capturing second ocular images from second reflected light having the second non-visible light wavelength, wherein the first ocular images and the second ocular images are captured with a camera configured to filter out light that is other than the first non-visible light wavelength and the second non-visible light wavelength.

18. The method of claim 17 further comprising:
determining eye-tracking positions based on the first ocular images and the second ocular images.

19. The method of claim 17, wherein the first ocular images are captured by the camera while the first non-visible light wavelength is illuminating the eye region and while the second non-visible light wavelength is not illuminating the eye region,
and wherein the second ocular images are captured by the camera while the second non-visible light wavelength is illuminating the eye region and while the first non-visible light wavelength is not illuminating the eye region.

20. The method of claim 17, wherein the camera that captures the first ocular images and the second ocular images captures includes:
first filters overlaying first pixels of the camera, wherein the first filters pass the first non-visible light wavelength and reject other light, the first ocular images generated by the first pixels; and
second filters overlaying second pixels of the camera, wherein the second filters pass the second non-visible light wavelength and reject other light, the second ocular images generated by the second pixels.

\* \* \* \* \*